(12) United States Patent  
Borgstadt

(10) Patent No.: US 8,177,411 B2  
(45) Date of Patent: May 15, 2012

(54) MIXER SYSTEM CONTROLLED BASED ON DENSITY INFERRED FROM SENSED MIXING TUB WEIGHT

(75) Inventor: Justin Borgstadt, Madison, WI (US)

(73) Assignee: Halliburton Energy Services Inc., Duncan, OK (US)

( * ) Notice: Subject to any disclaimer, the term of this patent is extended or adjusted under 35 U.S.C. 154(b) by 601 days.

(21) Appl. No.: 12/350,742

(22) Filed: Jan. 8, 2009

(65) Prior Publication Data

US 2010/0172202 A1 Jul. 8, 2010

(51) Int. Cl.  
*B28C 5/00* (2006.01)

(52) U.S. Cl. .......................................... 366/15; 366/18

(58) Field of Classification Search ................ 366/15, 366/18  
See application file for complete search history.

(56) References Cited

U.S. PATENT DOCUMENTS

| | | | |
|---|---|---|---|
| 3,379,421 A | 4/1968 | Putman | |
| 3,591,147 A | 7/1971 | Anderson et al. | |
| 3,605,775 A | 9/1971 | Zaander et al. | |
| 3,886,065 A | 5/1975 | Kappe et al. | |
| 3,933,041 A | 1/1976 | Hyer | |
| 4,141,656 A | 2/1979 | Mian | |
| 4,327,759 A | 5/1982 | Millis | |
| 4,349,435 A | 9/1982 | Ochiai | |
| 4,397,561 A | 8/1983 | Strong et al. | |
| 4,421,716 A | 12/1983 | Hench et al. | |
| 4,436,431 A | 3/1984 | Strong et al. | |
| 4,654,802 A | 3/1987 | Davis | |
| 4,764,019 A | 8/1988 | Kaminski et al. | |
| 4,779,186 A | 10/1988 | Handke et al. | |
| 5,027,267 A | 6/1991 | Pitts et al. | |
| 5,038,611 A | 8/1991 | Weldon et al. | |
| 5,098,667 A | 3/1992 | Young et al. | |
| 5,103,908 A | 4/1992 | Allen | |

(Continued)

FOREIGN PATENT DOCUMENTS

EP 0495098 A1 7/1992

(Continued)

OTHER PUBLICATIONS

Advisory Action dated Aug. 7, 2007 (3 pages), U.S. Appl. No. 11/121,144, filed May 3, 2005.

(Continued)

*Primary Examiner* — Maria Veronica Ewald  
*Assistant Examiner* — Robert J Grun  
(74) *Attorney, Agent, or Firm* — John W. Wustenberg; Conley Rose, P.C.

(57) ABSTRACT

A mixing system is provided comprising a first mixing tub, a first actuator to control flow of a carrier fluid, a sensor to determine a rate of flow of the fluid, and a second actuator to control flow of a dry material to form a mixture in the first mixing tub. The system further comprises a second mixing tub, a controller, and a weight sensor to determine the weight of the first mixing tub. The controller modulates the second actuator based on the rate of flow of the carrier fluid, based on the weight of the first mixing tub, and based on one of a sensed height of the mixture in the second mixing tub and a weight of the second mixing tub to provide the mixture at least one of at a commanded density and at a commanded flow rate. The mixture may be provided to a well bore to perform a servicing operation.

18 Claims, 8 Drawing Sheets

U.S. PATENT DOCUMENTS

| | | | |
|---|---|---|---|
| 5,114,239 | A | 5/1992 | Allen |
| 5,281,023 | A | 1/1994 | Cedillo et al. |
| 5,289,877 | A | 3/1994 | Naegele et al. |
| 5,320,425 | A | 6/1994 | Stephenson et al. |
| 5,365,435 | A | 11/1994 | Stephenson |
| 5,382,411 | A | 1/1995 | Allen |
| 5,423,205 | A | 6/1995 | Farchone |
| 5,441,340 | A | 8/1995 | Cedillo et al. |
| 5,452,954 | A | 9/1995 | Handke et al. |
| 5,503,473 | A | 4/1996 | Dearing, Sr. et al. |
| 5,570,743 | A | 11/1996 | Padgett et al. |
| 5,571,281 | A | 11/1996 | Allen |
| 5,590,958 | A | 1/1997 | Dearing, Sr. et al. |
| 5,624,182 | A | 4/1997 | Dearing, Sr. et al. |
| 5,775,803 | A | 7/1998 | Montgomery et al. |
| 5,869,750 | A * | 2/1999 | Onan et al. ............... 73/64.41 |
| 6,007,227 | A | 12/1999 | Carlson |
| 6,113,256 | A | 9/2000 | Bonissone et al. |
| 6,120,172 | A | 9/2000 | Chen et al. |
| 6,120,173 | A | 9/2000 | Bonissone et al. |
| 6,253,607 | B1 | 7/2001 | Dau |
| 6,491,421 | B2 | 12/2002 | Rondeau et al. |
| 6,505,519 | B2 | 1/2003 | Henry et al. |
| 6,786,629 | B2 | 9/2004 | Rondeau et al. |
| 6,932,169 | B2 | 8/2005 | Wylie et al. |
| 7,056,008 | B2 | 6/2006 | Rondeau et al. |
| 7,270,141 | B2 | 9/2007 | Dykstra |
| 7,284,898 | B2 | 10/2007 | Duell et al. |
| 7,308,379 | B2 | 12/2007 | Dykstra et al. |
| 7,353,874 | B2 | 4/2008 | Dykstra et al. |
| 7,353,875 | B2 | 4/2008 | Stephenson et al. |
| 7,356,427 | B2 | 4/2008 | Dykstra et al. |
| 7,386,368 | B2 | 6/2008 | Andersen et al. |
| 7,387,159 | B2 | 6/2008 | Fitzgerald |
| 7,392,113 | B2 | 6/2008 | Dykstra |
| 7,415,364 | B2 | 8/2008 | Mazrooee et al. |
| 7,433,762 | B2 | 10/2008 | Dykstra |
| 7,494,263 | B2 | 2/2009 | Dykstra et al. |
| 7,561,943 | B2 | 7/2009 | Dykstra et al. |
| 7,567,856 | B2 | 7/2009 | Dykstra et al. |
| 7,606,636 | B2 | 10/2009 | Dykstra |
| 7,620,481 | B2 | 11/2009 | Dykstra |
| 7,636,614 | B2 | 12/2009 | Dykstra |
| 7,686,499 | B2 | 3/2010 | Dykstra |
| 2003/0161211 | A1 | 8/2003 | Duell et al. |
| 2005/0135185 | A1 | 6/2005 | Duell et al. |
| 2006/0141107 | A1 | 6/2006 | Schwimmer et al. |
| 2006/0233039 | A1* | 10/2006 | Dykstra et al. ............ 366/8 |
| 2007/0153622 | A1 | 7/2007 | Dykstra et al. |
| 2007/0153623 | A1 | 7/2007 | Dykstra et al. |
| 2007/0153624 | A1 | 7/2007 | Dykstra et al. |
| 2007/0171765 | A1 | 7/2007 | Dykstra et al. |
| 2008/0084783 | A1 | 4/2008 | Mazrooee et al. |
| 2008/0164023 | A1 | 7/2008 | Dykstra et al. |
| 2008/0236818 | A1 | 10/2008 | Dykstra |
| 2009/0228220 | A1 | 9/2009 | Borgstadt |

FOREIGN PATENT DOCUMENTS

| | | |
|---|---|---|
| EP | 1356188 B1 | 10/2003 |
| WO | 9519221 A2 | 7/1995 |
| WO | 9519221 A3 | 7/1995 |
| WO | 0236929 A1 | 5/2002 |
| WO | 0244517 A1 | 6/2002 |
| WO | 03065015 A1 | 8/2003 |

OTHER PUBLICATIONS

Advisory Action dated Oct. 1, 2007 (3 pages), U.S. Appl. No. 11/029,072, filed Jan. 4, 2005.

Foreign communication from a related counterpart application—International Search Report and Written Opinion, PCT/GB2006/001307, Jul. 13, 2006, 10 pages.

Foreign communication from a related counterpart application—International Search Report and Written Opinion, PCT/GB2006/001302, Jul. 17, 2006, 14 pages.

Foreign communication from a related counterpart application—Invitation to Pay Additional Fees, PCT/GB2006/000025, Jul. 24, 2006, 5 pages.

Foreign communication from a related counterpart application—International Search Report and Written Opinion, PCT/GB2006/001338, Aug. 3, 2006, 12 pages.

Foreign communication from a related counterpart application—International Search Report and Written Opinion, PCT/GB2006/000025, Oct. 11, 2006, 17 pages.

Kanagasabapathy, P., et al., "Neural network with reinforcement learning for adaptive time-optimal control of tank level," XP009072551, pp. 17-47, Anna University, Chennai, India.

Notice of Allowance dated Oct. 1, 2007 (13 pages), U.S. Appl. No. 11/121,144, filed May 3, 2005.

Notice of Allowance dated Nov. 6, 2007 (7 pages), U.S. Appl. No. 11/029,072, filed Jan. 4, 2005.

Notice of Allowance dated Jan. 29, 2008 (5 pages), U.S. Appl. No. 11/121,325, filed May 3, 2005.

Notice of Allowance dated Oct. 14, 2008 (6 pages), U.S. Appl. No. 11/121,278, filed May 3, 2005.

Office Action dated Aug. 22, 2006 (8 pages), U.S. Appl. No. 11/029,072, filed Jan. 4, 2005.

Office Action dated Jan. 8, 2007 (16 pages), U.S. Appl. No. 11/029,072, filed Jan. 4, 2005.

Office Action dated Feb. 13, 2007 (21 pages), U.S. Appl. No. 11/121,144, filed May 3, 2005.

Office Action (Final) dated Jun. 8, 2007 (13 pages), U.S. Appl. No. 11/121,144, filed May 3, 2005.

Office Action (Final) dated Jun. 14, 2007 (11 pages), U.S. Appl. No. 11/029,072, filed Jan. 4, 2005.

Office Action dated Jul. 3, 2007 (18 pages), U.S. Appl. No. 11/121,325, filed May 3, 2005.

Office Action (Final) dated Nov. 13, 2007 (10 pages), U.S. Appl. No. 11/121,325, filed May 3, 2005.

Office Action dated May 29, 2008 (27 pages), U.S. Appl. No. 11/121,278, filed May 3, 2005.

Office Action dated Sep. 8, 2008 (12 pages), U.S. Appl. No. 12/054,211, filed Mar. 24, 2008.

Pan, Haizhou, et al., "Experimental validation of a nonlinear backstepping liquid level controller for a state coupled two tank system," Control Engineering Practice, 2005, pp. 27-40, vol. 13, Elsevier Ltd.

Patent application entitled "Control System Design for a Mixing System With Multiple Inputs" by Jason D. Dykstra, et al., filed Jan. 8, 2009, as U.S. Appl. No. 12/350,758.

Tylee, J. Louis, "Educational uses of microcomputers in control systems design and analysis," Proceedings of the Conference on Modeling and Simulation on Microcomputers, Jan. 14-16, 1987, pp. 132-136, 1 cover page, and 1 publication page, A Society for Computer Simulation (Simulation Councils, Inc.), San Diego, California.

Office Action (Final) dated Feb. 4, 2009 (17 pages), U.S. Appl. No. 12/054,211, filed Mar. 24, 2008.

Notice of Allowance dated Apr. 20, 2009 (5 pages), U.S. Appl. No. 12/054,211, filed Mar. 24, 2008.

* cited by examiner

MIXER SYSTEM CONTROLLED BASED ON DENSITY INFERRED FROM SENSED MIXING TUB WEIGHT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A control system typically comprises one or more physical system components under some form of automated control that cooperate to achieve a set of common objectives. The control system may be designed to reliably control the physical system components in the presence of external disturbances, variations among physical components due to manufacturing tolerances, and changes in commanded input values for controlled output values, such as a cement mixture density, for example. The control system may also be designed to remain stable and avoid oscillations within a range of specific operating conditions.

In a well bore environment, a control system may be used when mixing materials to achieve a desired mixture output. For example, when drilling an oil or gas well, it is common to install a tubular casing into the well bore and cement the casing in place against the well bore wall. A mixing system that supports well bore servicing operations, such as cementing casing into a well bore, may be designed with a control system configured to provide a desired volumetric flow rate of mixed cement having a desired density. In particular, the cement mixing control system may control actuators that allow the in-flow of dry cement material and water to obtain the desired cement mixture density and desired cement mixture volumetric flow rate. The control system may operate, for example, by monitoring the cement mixture flow rate and density, and by regulating an in-flow water actuator and an in-flow dry cement material actuator. Likewise, a fracturing fluid mixing system of similar structure may be employed to mix fluids for fracturing a formation during well completion and/or well production operations. A fracturing fluid mixing system may be designed with a control system configured to provide a desired volumetric flow rate and a desired density of mixed proppant and carrier fluid and optionally other solids and/or fluids suitable for fracturing a formation. The fracturing fluid mixing control system may control actuators that allow the in-flow of proppant material and carrier to obtain the desired fracturing fluid mixture density and desired fracturing fluid mixture volumetric flow rate. The control system may operate, for example, by monitoring the fracturing fluid mixture flow rate and density, and by regulating an in-flow carrier fluid actuator and an in-flow proppant actuator.

SUMMARY

In an embodiment, a mixing system is disclosed. The system comprises a first mixing tub, a first actuator to control flow of a carrier fluid into the first mixing tub, a sensor to determine a rate of flow of the carrier fluid, and a second actuator to control flow of a dry material into the first mixing tub, wherein the carrier fluid and the dry material mix in the first mixing tub to form a mixture. The system also comprises a second mixing tub, a controller, and an at least one weight sensor. The at least one weight sensor determines the weight of the first mixing tub. The first mixing tub is configured to flow the mixture into the second mixing tub. The controller automatically modulates the second actuator based on the rate of flow of the carrier fluid, based on the weight of the first mixing tub, and based on one of a sensed height of the mixture in the second mixing tub and a weight of the second mixing tub to provide the mixture at least one of at substantially a commanded density and at substantially a commanded flow rate to a consumer (e.g., a well bore or well bore servicing company). In an embodiment, the controller may further automatically modulate the first actuator based on the rate of flow of the carrier fluid, based on the weight of the first mixing tub, and based on one of the sensed height of the mixture in the second mixing tub and the sensed weight of the second mixing tub, wherein the controller automatically modulates the first actuator and the second actuator to provide the mixture at substantially the commanded density and substantially at the commanded flow rate to the consumer. In an embodiment, two weight sensors may be provided to determine the weight of the first mixing tub. In an embodiment, the system may further comprise a weight observer to provide an estimate of the weight of the first mixing tub based on an output of the at least one weight sensor, wherein the estimate of the weight of the first mixing tub may be a smoothed, unlagged value, and wherein the controller may automatically modulate the second actuator in part based on the estimate of the weight of the first mixing tub. In an embodiment, the weight observer may also determine a first estimate of the disturbance, where the disturbance takes account of at least one of inaccuracies of design estimates of physical system parameters and unmeasured physical system parameters, based on the output of the at least one weight sensor, wherein the controller further automatically modulates the second actuator in part based on the first estimate of the disturbance. In an embodiment, the first mixing tub may be mechanically decoupled from the second mixing tub. In an embodiment, the controller may automatically modulate the second actuator in part based on an estimated density of the mixture, wherein the controller may determine the estimated density by dividing an estimate of the weight of the mixture in the first mixing tub by a volume of the first mixing tub and wherein the weight of the mixture in the first mixing tub may be based on the weight of the first mixing tub. In an embodiment, the first actuator and the second actuator may be one of a valve, a screw feeder, an auger, and an elevator. In an embodiment, the mixture may be a cement slurry. In an embodiment, the mixture may be a fracturing fluid. In an embodiment, the system may further include a height observer to provide an estimate of the height of the mixture in the second mixing tub based on an output of a height sensor, wherein the estimate of the height of the mixture in the second mixing tub is a smoothed, unlagged value, and wherein the controller may automatically modulate the second actuator in part based on the estimate of the height of the mixture in the second mixing tub. In an embodiment, the height observer may also determine a second estimate of the disturbance, where the disturbance takes account of at least one of inaccuracies of design estimates of physical system parameters and unmeasured physical system parameters, based on the output of the at least one height sensor, wherein the controller further automatically modulates the second actuator in part based on the second estimate of the disturbance.

In an embodiment, a method of mixing a mixture is provided. The method comprises determining a rate of flow of a carrier fluid into a first mixing tub, determining a weight of the first mixing tub, determining one of a weight of a second mixing tub and a height of the mixture in the second mixing tub, wherein the first mixing tub is configured to flow its contents into the second mixing tub, and automatically modulating a rate of flow of a dry material into the first mixing tub based on the rate of flow of the carrier fluid, based on the weight of the first mixing tub, and based on the one of the weight of the second mixing tub and the height of the mixture in the second mixing tub, to provide the mixture at least one of at substantially a commanded density and at substantially a commanded flow rate to a consumer (e.g., a well bore or servicing company). In an embodiment, the automatically modulating the rate of flow of the dry material into the first mixing tub based on the weight of the first mixing tub may comprise estimating a density of the mixture in the first mixing tub by determining an estimated weight of the mixture in the first mixing tub by subtracting an empty weight of the first tub from the weight of the first mixing tub and dividing the estimated weight of the mixture in the first mixing tub by a volume of the first mixing tub. In an embodiment, the determining the weight of the first mixing tub may comprise adding a weight sensed by a first load cell coupled to the first mixing tank with a weight sensed by a second load cell coupled to the first mixing tank. In an embodiment, the method may further comprise automatically modulating the rate of flow of the carrier fluid into the first mixing tub based on the rate of flow of the carrier fluid, based on the weight of the first mixing tub, and based on the one of the weight of the second mixing tub and the height of the mixture in the second mixing tub, wherein the automatically modulating the rate of flow of the carrier fluid into the first mixing tub and modulating the rate of flow of the dry material into the first mixing tub provides the mixture at substantially the commanded density and at substantially the commanded flow rate to the consumer. In an embodiment, the method may further comprise inputting the at least one of the commanded density and the commanded flow rate from a control panel. In an embodiment, the method may further comprise determining a rate of flow of the mixture out of the second mixing tub, wherein the commanded flow rate may be substantially equal to the rate of flow of the mixture out of the second mixing tub. In an embodiment, the mixture may be a cement slurry. In an embodiment, the mixture may be a fracturing fluid. In an embodiment, the mixture may be a paint. In an embodiment, the mixture may be a cosmetic. In an embodiment, the mixture may be a food product. In an embodiment, the mixture is provided to a well bore.

In an embodiment, a mixing system is provided. The system comprises a first mixing tub, a first actuator to control flow of a carrier fluid into the first mixing tub, a sensor to determine a rate of flow of the carrier fluid, a second actuator to control flow of a dry material into the first mixing tub, wherein the carrier fluid and the dry material mix in the first mixing tub to form a mixture, a density sensor to determine a density of the mixture in the first mixing tub, a second mixing tub, wherein the first mixing tub is configured to flow the mixture into the second mixing tub, an at least one weight sensor to determine a weight of the second mixing tub, and a controller to automatically modulate the second actuator based on the rate of flow of the carrier fluid, based on the density of the mixture in the first mixing tub, and based on the weight of the second mixing tub to provide the mixture at least one of substantially a commanded density and at substantially a commanded flow rate to a consumer (e.g., a well bore and/or servicing company). In an embodiment, the first mixing tub may be mechanically decoupled from the second mixing tub. In an embodiment, the system may comprise a recirculation mechanism to recirculate the mixture in the first mixing tub, wherein the density sensor may be collocated with the recirculation mechanism. In an embodiment, two load cells are provided to determine the weight of the second mixing tub. In an embodiment, the system may further comprise a weight observer to provide an estimate of the weight of the second mixing tub based on the output of the at least one weight sensor, wherein the estimate of the weight of the second mixing tub may be a smoothed, unlagged value, and wherein the controller may automatically modulate the second actuator in part based on the estimate of the weight of the second mixing tub. In an embodiment, the weight observer may also determine an estimate of the disturbance, where the disturbance takes account of at least one of inaccuracies of design estimates of physical system parameters and unmeasured physical system parameters, based on the output of the at least one weight sensor, wherein the controller further automatically modulates the second actuator in part based on the estimate of the disturbance. In an embodiment, the controller may be one of an analog control system comprised of control blocks implemented by differential amplifiers, resistors, and capacitors and a digital control system comprised of control blocks implemented by computer instructions. In an embodiment, the controller may further automatically modulate the first actuator based on the rate of flow of the carrier fluid, based on the density of the mixture in the first mixing tub, and based on the output of the weight of the second mixing tub, wherein the controller automatically modulates the first actuator and the second actuator to provide the mixture at substantially the commanded density and at substantially the commanded flow rate to the consumer. In an embodiment, the first actuator and the second actuator may be one of a valve, a screw feeder, an auger, and an elevator. In an embodiment, the mixture may be a cement slurry. In an embodiment, the mixture may be a fracturing fluid. In an embodiment, the mixture is provided to a well bore.

In an embodiment, a method of mixing a mixture is provided. The method comprises determining a rate of flow of a carrier fluid into a first mixing tub, determining a density of the mixture in the first mixing tub, determining a weight of a second mixing tub, wherein the first mixing tub is configured to flow its contents into the second mixing tub, and automatically modulating a rate of flow of a dry material into the first mixing tub based on the rate of flow of the carrier fluid, based on the weight of the second mixing tub, and based on the density of the mixture in the first mixing tub to provide the mixture at least one of at substantially a commanded density and at substantially a commanded flow rate to a consumer (e.g., a well bore or servicing company). In an embodiment, the determining the weight of the second mixing tub may comprise adding a weight sensed by a first load cell coupled to the second mixing tank with a weight sensed by a second load cell coupled to the second mixing tank. In an embodiment, the method may further comprise automatically modulating the rate of flow of the carrier fluid into the first mixing tub based on the rate of flow of the carrier fluid, based on the weight of the second mixing tub, and based on the density of the mixture in the first mixing tub, wherein the automatically modulating the rate of flow of the carrier fluid into the first mixing tub and modulating the rate of flow of the dry material into the first mixing tub provides the mixture at substantially the commanded density and at substantially the commanded flow rate to the consumer. In an embodiment, the method may further comprise inputting the at least one of the commanded density and the commanded flow rate from a control panel. In an embodiment, the method may further comprise determining a rate of flow of the mixture out of the second mixing tub, wherein the commanded flow rate may be substantially equal to the rate of flow of the mixture out of the second mixing tub. In an embodiment, the mixture may be a cement slurry. In an embodiment, the mixture may be a fracturing fluid. In an embodiment, the mixture may be a paint. In an embodiment, the mixture may be a cosmetic. In an embodiment, the mixture may be a food product. In an embodiment, the mixture is provided to a well bore.

In an embodiment, a mixing system is provided. The system comprises a divided mixing tub comprising a first tub and a second tub, a first actuator to control flow of a carrier fluid into the first tub, a sensor to determine a rate of flow of the carrier fluid, and a second actuator to control flow of a dry material into the first tub, wherein the carrier fluid and the dry material mix in the first tub to form a mixture, the mixture overflows the first tub into the second tub, and the mixture is further mixed in the second tub. The system also comprises an at least one weight sensor to determine the weight of the divided mixing tub, a height sensor to determine a height of the mixture in the second tub, and a controller. The controller automatically modulates the second actuator based on the rate of flow of the carrier fluid, based on the height of the mixture in the second tub, and based on the weight of the divided mixing tub to provide the mixture at least one of at substantially a commanded density and at substantially a commanded flow rate to a consumer (e.g., a well bore or servicing company). In an embodiment, the controller may further automatically modulate the first actuator based on the rate of flow of the carrier fluid, based on the weight of the divided mixing tub, and based on the height of the mixture in the second tub and wherein the controller automatically modulates the first actuator and the second actuator to provide the mixture at substantially the commanded density and substantially the commanded flow rate to the consumer (e.g., a well bore or servicing company). In an embodiment, two weight sensors may be provided to determine the weight of the divided mixing tub. In an embodiment, the system may further comprise a weight observer to provide an estimate of the weight of the divided mixing tub based on an output of the at least one weight sensor, wherein the estimate of the weight of the divided mixing tub is a smoothed, unlagged value, and wherein the controller automatically modulates the second actuator in part based on the estimate of the weight of the divided mixing tub. In an embodiment, the weight observer may also determine a first estimate of the disturbance, where the disturbance takes account of at least one of inaccuracies of design estimates of physical system parameters and unmeasured physical system parameters, based on the output of the at least one weight sensor, wherein the controller further automatically modulates the second actuator in part based on the first estimate of the disturbance. In an embodiment, the controller automatically may modulate the second actuator in part based on an estimated density of the mixture, wherein the controller determines the estimated density by dividing an estimate of the weight of the mixture in the dividing mixing tub by a volume of the mixture in the divided mixing tub and wherein the volume of the mixture in the divided mixing tub is based in part on the height of the mixture in the second tub. In an embodiment, the first actuator and the second actuator may be one of a valve, a screw feeder, an auger, and an elevator. In an embodiment, the mixture may be a cement slurry. In an embodiment, the mixture may be a fracturing fluid. In an embodiment, the mixture is provided to a well bore. In an embodiment, the system may further include a height observer to provide an estimate of the height of the mixture in the second tub based on an output of a height sensor, wherein the estimate of the height of the mixture in the second tub is a smoothed, unlagged value, and wherein the controller may automatically modulate the second actuator in part based on the estimate of the height of the mixture in the second tub. In an embodiment, the height observer may also determine a second estimate of the disturbance, where the disturbance takes account of at least one of inaccuracies of design estimates of physical system parameters and unmeasured physical system parameters, based on the output of the at least one height sensor, wherein the controller further automatically modulates the second actuator in part based on the second estimate of the disturbance.

In an embodiment, a method of mixing a mixture is provided. The method comprises determining a rate of flow of a carrier fluid into a first tub of a divided mixing tub comprising the first tub and a second tub, wherein the first tub is configured to flow its contents into the second tub, determining a weight of the divided mixing tub, determining a height of the mixture in the second tub, and automatically modulating a rate of flow of a dry material into the first tub based on the rate of flow of the carrier fluid, based on the weight of the divided mixing tub, and based on the height of the mixture in the second tub, to provide the mixture at least one of at substantially a commanded density and at substantially a commanded flow rate to a consumer (e.g., a well bore or servicing company). In an embodiment, automatically modulating the rate of flow of the dry material into the first tub based on the weight of the divided mixing tub may comprise estimating a density of the mixture in the divided mixing tub by determining an estimated weight of the mixture in the divided mixing tub by subtracting an empty weight of the divided mixing tub from the weight of the divided mixing tub and dividing the estimated weight of the mixture in the divided mixing tub by a sum of a volume of the mixture in the first tub and a volume of the mixture in the second tub, wherein the volume of the mixture in the second tub is based on the height of the mixture in the second tub. In an embodiment, determining the weight of the divided mixing tub may comprise adding a weight sensed by a first load cell coupled to the divided mixing tub with a weight sensed by a second load cell coupled to the divided mixing tub. In an embodiment, the method may further comprise automatically modulating the rate of flow of the carrier fluid into the first tub based on the rate of flow of the carrier fluid, based on the weight of the divided mixing tub, and based on the height of the mixture in the second tub, wherein the automatically modulating the rate of flow of the carrier fluid into the first tub and modulating the rate of flow of the dry material into the first tub may provide the mixture at substantially the commanded density and at substantially the commanded flow rate to the consumer. In an embodiment, the method may further comprise inputting the at least one of the commanded density and the commanded flow rate from a control panel. In an embodiment, the method may further comprise determining a rate of flow of the mixture out of the second tub and wherein the commanded flow rate is substantially equal to the rate of flow of the mixture out of the second tub. In an embodiment, the mixture may be a cement slurry. In an embodiment, the mixture may be a fracturing fluid. In an embodiment, the mixture may be a paint. In an embodiment, the mixture may be a cosmetic. In an embodiment, the mixture may be a food product. In an embodiment, the mixture is provided to a well bore.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Figure 1:
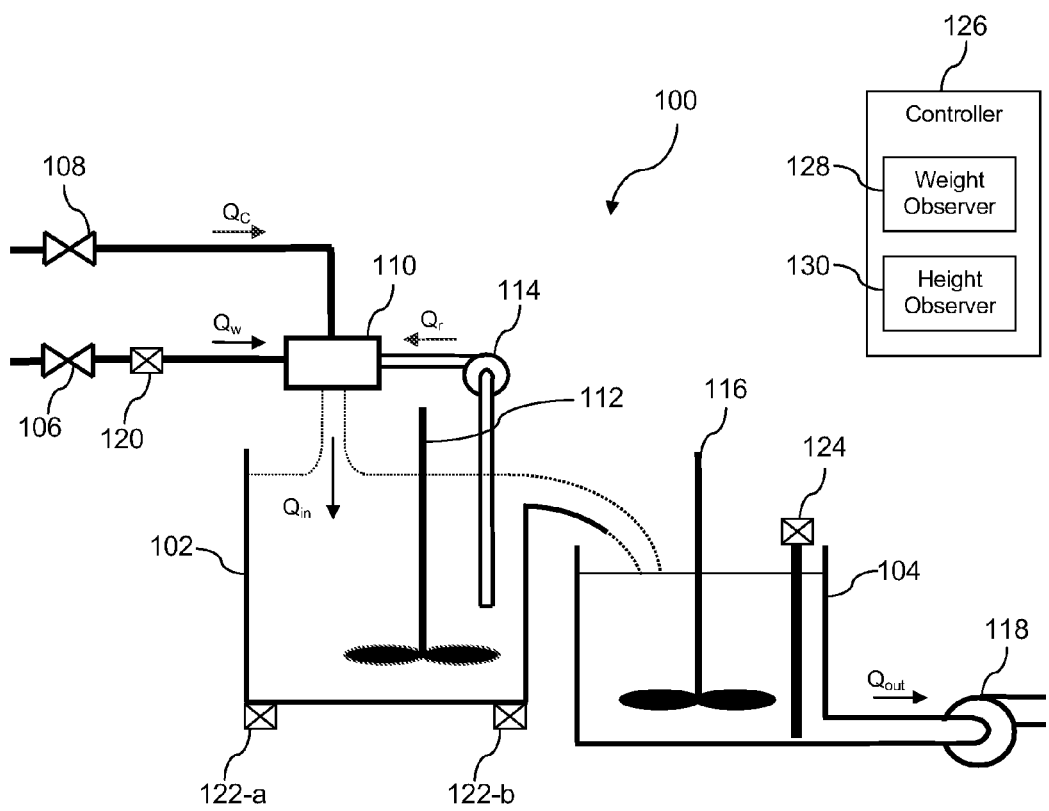
FIG. 1 is an illustration of a cement mixer system according to an embodiment of the disclosure.

Turning now to FIG. 1, a first mixer system 100 is described. In an embodiment, the first system 100 comprises a first mixing tub 102, a second mixing tub 104, a first actuator 106, a second actuator 108, a mixing head 110, a first mixing paddle 112, a recirculation pump 114, a second mixing paddle 116, a mixture supply pump 118, a flow rate sensor 120, a first weight sensor 122, a height sensor 124, and a controller 126. In another embodiment, the first mixing system 100 may comprise additional components such as additional actuators, additional sensors, and/or other components. In an embodiment, the first mixer system 100 is suitable, for example, for providing a continuous cement mixing function in support of well bore servicing operations, such as cementing casing into a well bore. In other embodiments, however, the first mixer system 100 is suitable for other mixing operations, for example for providing a continuous fracturing fluid mixing function in support of well bore servicing operations, for example a formation fracturing operation during well completion and/or production enhancement operations. The first mixer system 100 may also be suitable to other continuous mixing operations in the manufacture of paints, chemicals, soaps, cosmetics, food products, and other mixed compositions.

A control panel (not shown) may be used to input commanded values of mixture density, mixture supply flow rate, and other commanded values to the controller 126. In an embodiment, the controller 126 controls at least some of the components of the first system 100 to deliver a mixture at least one of at substantially the commanded density and at substantially the commanded flow rate at the output of the mixture supply pump 118. In an embodiment, the controller 126 controls the first actuator 106 to deliver a mixture at least one of at substantially the commanded density and at substantially the commanded flow rate. In an embodiment, the controller 126 controls the second actuator 108 to deliver a mixture at least one of at substantially the commanded density and at substantially the commanded flow rate. In another embodiment, however, the controller 126 controls both the first actuator 106 and the second actuator 108 to deliver other mixtures at substantially the commanded density and at substantially the commanded flow rate at the output of the mixture supply pump 118.

The first mixing tub 102 may be positioned and/or configured to flow the mixture into the second mixing tub 104. In an embodiment, the first mixing tub 102 comprises a weir over which the mixture overflows the first mixing tub 102 into the second mixing tub 104. In operating modes providing a high rate of flow of the mixture, air bubbles may become entrained in the mixture, for example in a mixture, and passing the mixture over the weir may tend to reduce this entrainment of air bubbles in the mixture. In some embodiments, the first mixing paddle 112 and/or the second mixing paddle 116 may be replaced by other mechanisms for mixing and/or blending the dry material into the carrier fluid to form a substantially homogenous mixture.

In an embodiment, the first mixing tub 102 and the second mixing tub 104 may be substantially mechanically decoupled from each other. The first mixing tub 102 may be free to move independently from the second mixing tub 104, for example because no pipes or other structures may be connected rigidly between the first mixing tub 102 and the second mixing tub 104. Because the first mixing tub 102 is not mechanically coupled to the second mixing tub 104, or to other mechanical structures, the weight of the first mixing tub 102 may depend substantially on the weight of the empty first mixing tub 102 and the weight of the mixture contained by the first mixing tub 102. The weight of the empty first mixing tub 102 may be configured into the controller 126. In other embodiments, however, other structures may be mechanically coupled to the first mixing tub 102, including the second mixing tub 102. In these other embodiments, the weight of the first mixing tub 102 may depend upon the weight of the mixture contained by the first mixing tub 102, the weight of the empty first mixing tub 102, and the mechanical coupling to the other structures.

During steady state operation of the first system 100, the volume of the mixture in the first mixing tub 102 may be determined as a constant $V_1$ that is substantially equivalent to the cross sectional area of the first mixing tub 102 multiplied by the height from the bottom of the first mixing tub 102 to the weir. While the volume of the mixture in the first mixing tub 102 may vary slightly with different rates of flow $Q_W$ and $Q_C$, to an acceptable degree of accuracy the volume of the mixture may be approximated as the constant volume $V_1$. The volume of the mixture in the second mixing tub 104 may be determined by the controller 126 as a variable $V_2$, substantially equivalent to the cross sectional area of the second mixing tub 104 multiplied by the height from the bottom of the second mixing tub 104 to the surface of the mixture in the second mixing tub 104, where the height of the surface of the mixture is determined based on the output of the height sensor 124.

The first actuator 106 and the second actuator 108 may be any of valves, screw feeders, augers, elevators, and other actuators known to those skilled in the art. The actuators 106, 108 may be modulated by controlling a position or by controlling a rotation rate of the actuator 106, 108. For example, if the actuator 106, 108 is a valve, the valve may be modulated by varying the position of the valve. For example, if the actuator 106, 108 is a screw feeder, the screw feeder may be modulated by varying the rotational speed of the screw feeder. For example, if the actuator 106,108 is an elevator, the elevator may be modulated by varying a linear speed of the elevator. The first actuator 106 controls the flow of a carrier fluid, for example water, into the first mixing tub 102. The first actuator 106 may be modulated by the controller 126 to provide the carrier fluid at a rate of flow, represented by the variable $Q_w$, to the mixing head 110. The second actuator 108 controls the flow of a dry material, for example dry cement, proppants, and/or additive material, into the first mixing tub 102. The second actuator 108 may be modulated by the controller 126 to provide the dry material at a rate of flow, represented by the variable $Q_c$, to the mixing head 110. In an embodiment, pressurized air may be introduced into the dry material upstream of the second actuator 108 to fluidize the dry material as well as to provide at least some motive force to convey the dry material from a supply vessel (not shown) to the second actuator 108 and from the second actuator 108 to the mixing head 110. In an embodiment, the carrier fluid and the dry material are flowed together in the mixing head 110 and flow out of the mixing head 110 into the first mixing tub 102. In another embodiment, however, the mixing head 110 may be omitted from the system 100 and the first actuator 106 and the second actuator 108 may dispense their materials directly into the first mixing tub 102. Additionally, in another embodiment, additional actuators (not shown) may be provided to control the introduction of other materials into the first mixing tub 102.

The mixture is further mixed in the first mixing tub 102 by the first mixing paddle 112. In an embodiment, the mixture is recirculated from within the first mixing tub 102 back to the mixing head 110 wherefrom it is flowed back into the first mixing tub 102, thereby contributing to the forming a substantially homogenous, uniformly dense mixture in the first mixing tub 102. In an embodiment, a flow rate $Q_{in}$ may comprise the flow components $Q_w$, $Q_c$, and a flow component $Q_r$ attributed to a flow rate through the recirculation pump 114.

When the first system 100 is operating at steady state, the mixture flows from the first mixing tub 102 into the second mixing tub 104 at a rate that is substantially equal to the combined rate of flow of the carrier fluid and the dry material into the first mixing tub 102, $Q_w+Q_c$. The mixture in the second mixing tub 104 is further mixed by the second mixing paddle 116. The mixture is delivered by the mixture supply pump 118 at a flow rate represented by the variable $Q_{out}$ to well bore servicing equipment (not shown), for example equipment for cementing a casing in a well bore. In an embodiment, the controller 126 controls the flow rate of the mixture supply pump 118.

The flow rate $Q_w$ may be sensed by the flow rate sensor 120. In an embodiment, the flow rate sensor 120 may be a turbine-type flow rate meter. Some turbine-type flow rate meters may be highly accurate. The first weight sensor 122 may sense a weight of the first mixing tub 102 or a portion of the weight of the first mixing tub 102. In an embodiment, the first mixing tub 102 may be secured by a hinge along one bottom edge and the first weight sensor 122 may be coupled to the opposite bottom edge of the first mixing tub 102. In an embodiment, the first weight sensor 122 may be positioned in about a balance point under the center of the first mixing tub 102. In an embodiment, the first weight sensor 122 comprises a first load cell 122-a and a second load cell 122-b that are located at the bottom and at ends of the first mixing tub 102. In an embodiment, the first load cell 122-a and the second load cell 122-b may have a bar-like form or shape, but in other embodiments the load cells 122-a, b may take other forms. In an embodiment, the first weight sensor 122 may be located in the interior of the first mixing tub 102, for example as a sensor pad fully or partially covering the inside bottom of the first mixing tub 102. In an embodiment, the first weight sensor 122 may comprise one or more small pressure sensors located substantially flush with the inside bottom of the first mixing tub 102. These and other weight sensors, numbers of weight sensors, and locations of the weight sensors are contemplated by the present disclosure. The height sensor 124 may sense a height of the mixture in the second mixing tub 104.

The controller 126 receives the sensed values output by the flow rate sensor 120, the first weight sensor 122, and the height sensor 124. From these sensed values, the controller 126 is able to determine commands to control the first actuator 106, the second actuator 108, and optionally the mixture supply pump 118, based on the commanded density and the commanded flow rate received from the control panel (not shown). The controller 126 may transform the sensed weight of the first mixing tub 102 to a density of the mixture based on the known volume of the first mixing tub 102 and based on a known empty weight of the first mixing tub 102, for example by performing a calculation:

$$\text{Density}=(\text{Tub Weight}-\text{Empty Tub Weight})/V_1 \qquad (\text{Eq 1})$$

The known empty weight of the first mixing tub 102 may be configured into the controller 126. This method and system of determining the density of the mixture based on the volume of the first mixing tub 102 and based on the weight of the mixture contained in the first mixing tub 102 may be referred to as determining the density of the mixture by non-contact means. This may also be referred to as inferring density from sensed tub weight. Determining the density of the mixture by non-contact means may promote reducing maintenance and calibration activities associated with determining density with contact means, for example by using a densometer.

In an embodiment, the controller 126 may modulate the first actuator 106 to keep the flow rate of the carrier fluid $Q_w$ substantially constant and modulate the second actuator 108 to vary the flow rate of the dry material $Q_c$ to control the density of the mixture, for example when the combined flow rate $Q_w+Q_c$ is substantially equal to the commanded flow rate. In another embodiment or under different operational conditions, however, the controller 126 may modulate both the first actuator 106 and the second actuator 108 concurrently. The controller 126 further may control the first system 100 to maintain the height of the mixture in the second mixing tub 104 between a minimum height to avoid draining the second mixing tub 104 completely and a maximum height to avoid overflowing the second mixing tub 104. In an embodiment, the controller 126 may control the first system 100 to maintain the height of the mixture in the second mixing tub 104 at about a target height that is a constant value, that is a value configured into the control system 126, and/or that is a value input to the controller 126 using the control panel (not shown).

In an embodiment, the sensed weight provided by the weight sensor 122 is processed by a weight observer 128 of the controller 126. The output of the first weight sensor 122 may contain undesirable noise. The weight observer 128 may determine an estimated weight of the first mixing tub 102 that is a smoothed, non-lagged value based on the sensed weight of the first mixing tub 102 output by the first weight sensor 122 and based on a first command feed forward term. As used herein, non-lagged refers to substantially non-time-lagged and/or substantially non-phase shifted. In an embodiment, the first command feed forward term may be the commanded density. The controller 126 may control based in part on the estimated weight of the first mixing tub 102 provided by the weight observer 128. In an embodiment, the weight observer may also determine an estimate of the disturbance based on the sensed weight of the first mixing tub 102 output by the first weight sensor 122 and based on a first command feed forward term, where the disturbance may take account of at least one of inaccuracies of design estimates of physical system parameters and unmeasured physical system parameters. The controller 126 may further control based in part on the estimation of the disturbance determined by the weight observer 128. Further details of the weight observer are provided in U.S. patent application Ser. No. 12/044,251 filed Mar. 7, 2008, entitled "Weight Observer for Mass Metering and Inventory Management" by Justin A. Borgstadt, which is herein incorporated by reference.

Similarly, in an embodiment, the sensed height provided by the height sensor 124 may be processed by a height observer 130. The output of the height sensor 124 may contain undesirable noise. The height observer 130 may determine an estimated height of the mixture in the second mixing tub 104 that is a smoothed, non-lagged value based on the sensed height of the mixture in the second mixing tub 104 and based on a second command feed forward term. In an embodiment, the second command feed forward term may be a commanded height, for example a value between the maximum height and the minimum height described above. The controller 126 may control based in part on the estimated height of the mixture in the second mixing tub 104. In an embodiment, the height observer 130 may also determine an estimate of the disturbance based on the sensed height of the mixture in the second mixing tub 104 and based on a second command feed forward term, where the disturbance may take account of at least one of inaccuracies of design estimates of physical system parameters and unmeasured physical system parameters. The controller 126 may further control based in part on the estimate of the disturbance determined by the height observer 130. Further details of the height observer are provided in U.S. patent application Ser. No. 11/121,278 filed May 3, 2005, entitled "Control System Design for a Mixing System with Multiple Inputs," by Jason D. Dykstra and Justin A. Borgstadt, which is herein incorporated by reference.

In an embodiment, a densometer (not shown in FIG. 1) may be provided as a complement or supplement to the first weight sensor 122. In some embodiments, a densometer may have some disadvantages. For example, some densometers may incorporate radioactive sources, and safe handling of radioactive sources and/or complying with government regulations for handling of radioactive sources may entail cumbersome and/or expensive procedures. Densometers may provide unreliable readings under some operating conditions, for example when foam develops in the mixture. Densometers, depending upon their construction, may be vulnerable to erosion and/or corrosion in some operating environments, for example in the cement mixing operating environment and/or in the fracturing fluid mixing operating environment. Densometers may be vulnerable to plugging and/or partial plugging in some operating environments, for example in the cement mixing operating environment. Densometers may experience problems related to remaining calibrated in some operating environments. Notwithstanding these known shortcomings, in some embodiments the use of a densometer as a complement to non-contact means of determining density, for example the weight divided by volume technique described above, may provide some useful service.

In an embodiment that employs the densometer, the output of the densometer may be processed by a density observer (not shown in FIG. 1) of the controller 126. The density observer may determine an estimated density of the mixture that is smoothed, non-lagged value based on the sensed density output by the densometer. The controller 126 may control based in part on the estimated density of the mixture provided by the density observer. In an embodiment, the density observer may also determine an estimate of the disturbance based on the sensed density of the mixture and based on a third command feed forward term, where the disturbance may take account of at least one of inaccuracies of design estimates of physical system parameters and unmeasured physical system parameters. The controller 126 may further control based in part on the estimate of the disturbance determined by the density observer. Further details of the density observer are provided in U.S. patent application Ser. No. 11/121,278 filed May 3, 2005, entitled "Control System Design for a Mixing System with Multiple Inputs," by Jason D. Dykstra and Justin A. Borgstadt which is herein incorporated by reference.

The controller 126 may be implemented as an analog control system or as a digital control system. As known to those skilled in the art, control systems may be designed based on mathematical abstractions expressed in terms of Laplace transforms, where the mathematical abstractions correspond to control components and to models of physical components. One skilled in the art, in combination with the present disclosure, can readily implement the control system design either as an analog control system or as software algorithms on a general purpose computer. An analog control system may be composed of control blocks implemented by differential amplifiers, resistors, and capacitors, and a digital control system may be composed of control blocks implemented by computer instructions. In designing digital control systems, the continuous time Laplace transform is commonly replaced by the discrete time sampled Z-transform. An appropriate sampling rate and an appropriate control update rate are selected for the digital control system to provide the desired frequency response of the control system and to provide stability of the control system. General purpose computer systems are described in detail hereinafter.

Figure 2:
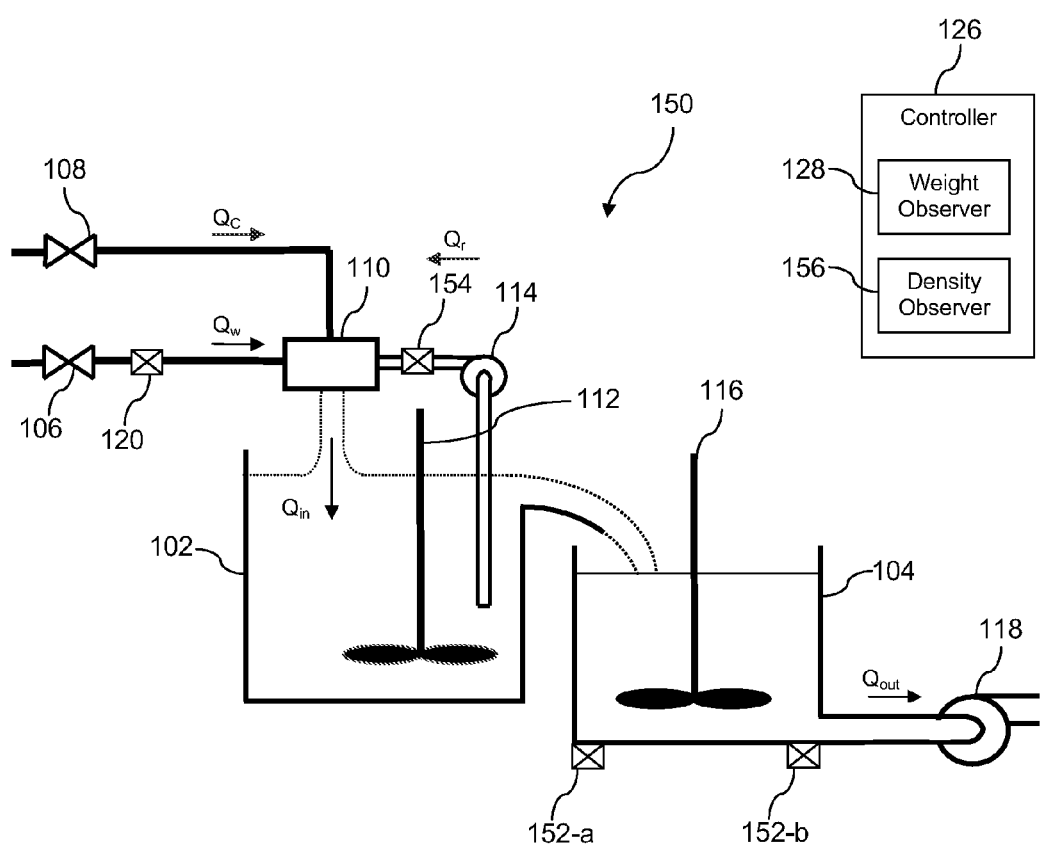
FIG. 2 is an illustration of another cement mixer system according to an embodiment of the disclosure.

Turning now to FIG. 2, a second mixer system 150 is described. The purpose and many of the components of the second system 150 are substantially similar to those of the first system 100 described with reference to FIG. 1. In the second system 150, a densometer 154 is provided for sensing the density of the mixture and a second weight sensor 152 is provided for sensing the weight of the second mixing tub 104. In an embodiment, the second weight sensor 152 may comprise a third load cell 152-*a* and a fourth load cell 152-*b* that are located at the bottom ends of the second mixing tub 104. In other embodiments, however, the second weight sensor 152 and/or the load cells 152 may be located in an alternative location, such as suggested above with reference to FIG. 1 and the location of the first weight sensor 122. In other embodiments, different numbers of weight sensors 152 and/or load cells 152 may be employed. The second system 150 omits the first weight sensor 122 and the height sensor 124 associated with the first system 100. In some contexts, the combination of the recirculation pump 114 and any associated recirculation plumbing and/or pipes may be referred to as a recirculation mechanism. In an embodiment, the densometer 154 may be collocated with the recirculation mechanism, for example within a flow line downstream from the recirculation pump 114. In another embodiment, however, the densometer 154 may be installed at a different location within the first mixing tub 102.

In the second system 150, the controller 126 may determine control signals to command the first actuator 106, the second actuator 108, and optionally the output of the mixture supply pump 118 to achieve the commanded mixture density and volumetric supply rate based on the sensed density of the mixture, based on the sensed weight of the second mixing tub 104, and based on the flow rate of the carrier fluid $Q_w$. The controller 126 may determine a volume of the mixture in the second mixing tub 104 by dividing the weight of the mixture in the second mixing tub 104 by the density of the mixture. The controller 126 may control the second system 150 to maintain the volume of mixture in the second mixing tub 104 between a minimum volume to avoid draining the second mixing tub 104 completely and a maximum volume to avoid overflowing the second mixing tub 104, as well as to provide the mixture at the commanded density and at the commanded rate to the mixture supply pump 118. In an embodiment, the controller 126 may control the second system 150, in part, to maintain the volume of the mixture in the second mixing tub 104 at about a target volume that is a constant value and/or a value configured into the control system 126. In an embodiment, the controller 126 may control the second actuator 108 to provide the mixture at least one of at substantially the commanded density and at substantially the commanded flow rate to the mixture supply pump 118.

Because various additional structures may be mechanically coupled to the second mixing tub 104, for example the mixture supply pump 118 and other downstream piping, the weight sensed by the second weight sensor 152 may not vary linearly with the weight of the mixture contained by the second mixing tub 104. The mechanical coupling to additional structures, for example, may introduce spring and damper effects into the weight sensed by the second weight sensor 152. In some embodiments, the mechanical coupling may have a negligible effect, and the weight of the mixture in the second mixing tub 104 may be approximated as the weight of the second mixing tub 104 minus a tare weight, where the tare weight corresponds to the empty weight of the second mixing tub 104 and a corresponding weight associated with the mechanical coupling to additional structures. The tare weight may be configured into the controller 126. In other embodiments, however, the mechanical coupling may be taken account of, for example, by mapping sensed values of the weight of the second mixing tub 104 to expected weight based on a break point look-up table or by a non-linear formula. As is known to those skilled in the art, in combination with the present disclosure, a break point look-up table comprises a mapping of specific input values to specific output values. Input values that fall between a first input value and an adjacent second input value defined by the look-up table are mapped to an output value by linearly interpolating between the output value associated with the first input value and the output value associated with the second output value. Such a break point look-up table can often be designed to approximate a non-linear function to the desired degree of accuracy.

In an embodiment, the sensed density provided by the densometer 154 is processed by a density observer 156. The output of the densometer 154 may contain undesirable noise. The density observer 156 may determine an estimated density of the mixture that is a smoothed, non-lagged value based on the sensed density of the mixture output by the densometer 154 and based on a third command feed forward term. In an embodiment, the third command feed forward term may be the commanded density. The controller 126 may control based in part on the estimated density provided by the density observer 156. In an embodiment, the density observer 156 may also determine an estimate of the disturbance based on the sensed density of the mixture and based on the third command feed forward term, where the disturbance may take account of at least one of inaccuracies of design estimates of physical system parameters and unmeasured physical system parameters. The controller 126 may further control based in part on the estimate of the disturbance determined by the density observer 156. Further details of the density observer 156 are provided in U.S. patent application Ser. No. 11/121,278 filed May 3, 2005, entitled "Control System Design for a Mixing System with Multiple Inputs," by Jason D. Dykstra and Justin A. Borgstadt.

Figure 3:
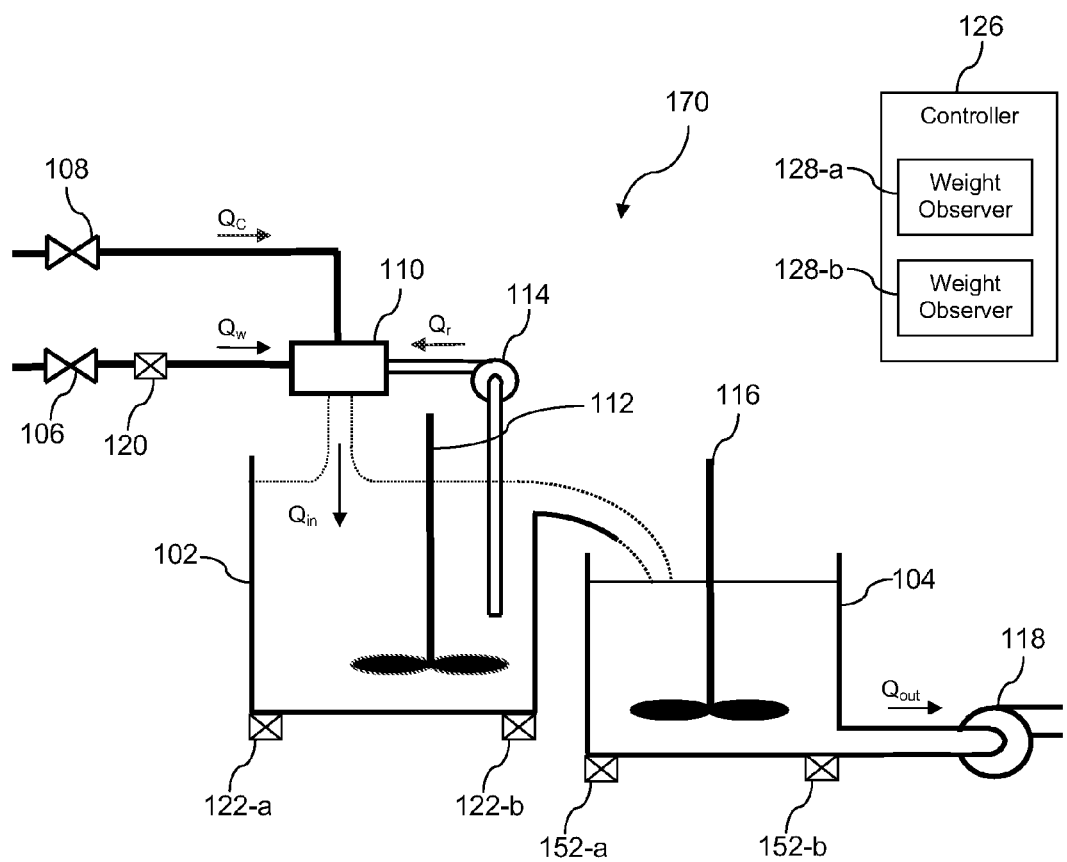
FIG. 3 is an illustration of another cement mixer system according to an embodiment of the disclosure.

Turning now to FIG. 3, a third mixer system 170 is described. The purpose and many of the components of the third system 170 are substantially similar to those of the first system 100 described with reference to FIG. 1. In the third system 170, the second weight sensor 152 is provided for sensing the weight of the second mixing tub 104. In an embodiment, the second weight sensor 152 may comprise the third load cell 152-a and the fourth load cell 152-b that are located at the bottom ends of the second mixing tub 104. The third system 170 omits the height sensor 124 associated with the first system 100. The controller 126 may determine the density of the mixture based on the sensed weight of the first mixing tub 102 as described with reference to FIG. 1 and determine the volume of the mixture in the second mixing tub 104 as described with reference to FIG. 2. The controller 126 may control the third system 170 to maintain the volume of mixture in the second mixing tub 104 between a minimum volume to avoid draining the second mixing tub 104 completely and a maximum volume to avoid overflowing the second mixing tub 104, as well as to provide the mixture at the commanded density and at the commanded rate to the mixture supply pump 118. In an embodiment, the controller 126 may control the third system 170, in part, to maintain the volume of mixture in the second mixing tub 104 at about a target volume that is a constant value and/or a value configured into the control system 126. In an embodiment, the controller 126 may control the second actuator 108 to provide the mixture at least one of at substantially the commanded density and at substantially the commanded flow rate to the mixture supply pump 118.

Figure 4:
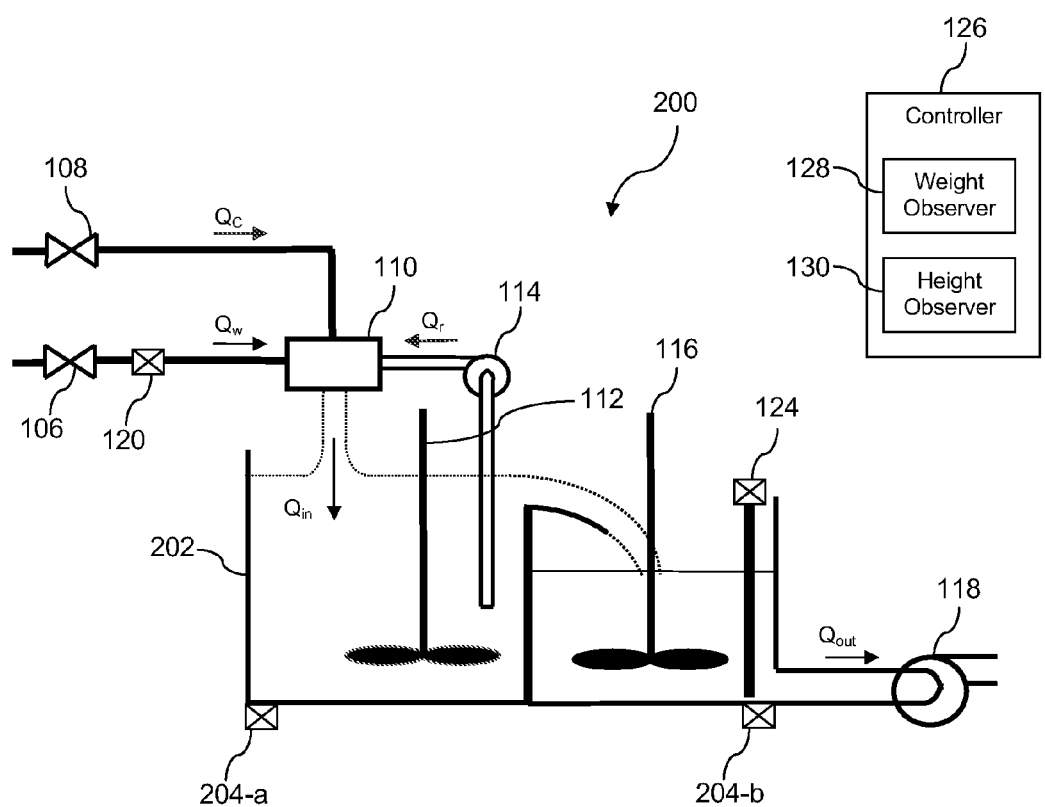
FIG. 4 is an illustration of another cement mixer system according to an embodiment of the disclosure.

Turning now to FIG. 4, a fourth mixer system 200 is described. The purpose and many of the components of the fourth system 200 are substantially similar to those of the first system 100 described with reference to FIG. 1. In the fourth system 200, the first mixer tub 102 and the second mixer tub 104 are replaced by a divided mixing tub 202 comprising a first tub corresponding to the first mixing tub 102 and a second tub corresponding to the second mixing tub 104. The mixture flows into the first tub from the mixing head 110 where it is mixed by the first mixing paddle 112 and recirculated by the recirculation pump 114. The mixture overflows from the first tub to the second tub, for example over a weir between the first tub and the second tub. The first weight sensor 122 associated with the first mixing tub 102 in the first system 100 is replaced with a third weight sensor 204 that senses the weight of the divided mixing tub 202. In an embodiment, the third weight sensor 204 comprises a fifth load cell 204-a and a sixth load cell 204-b that are located at the bottom ends of the divided mixing tub 202. In other embodiments, however, other numbers of weight sensors and/or load cells 204 may be employed, and the weight sensors and/or load cells 204 may be located at different locations. By determining the combined volume of the mixture in the first tub and the second tub, for example substantially as described with reference to FIG. 1 above, the density of the mixture may be determined as the division of the weight of the mixture divided by the volume of the mixture.

The weight of the mixture may be determined as the weight of the divided mixing tub 202 minus the weight of the empty divided mixing tub 202. Because the divided mixing tub 202 is mechanically coupled to other structures, the weight of the divided mixing tub 202 may depend not only on the weight of the mixture and the weight of the empty divided mixing tub 202. Alternatively, the weight of the mixture may be determined as the weight of the divided mixing tub 202 minus a tare weight, where the tare weight is composed of a weight of the divided mixing but 202 and a corresponding weight associated with the mechanical coupling to additional structures. The weight of the empty divided mixing tub 202 or the tare weight may be configured into the controller 126. Alternatively, the weight of the mixture may be determined based on the weight of the divided mixing tub 202 using a break point look-up table as described with reference to FIG. 2 above.

Figure 5:
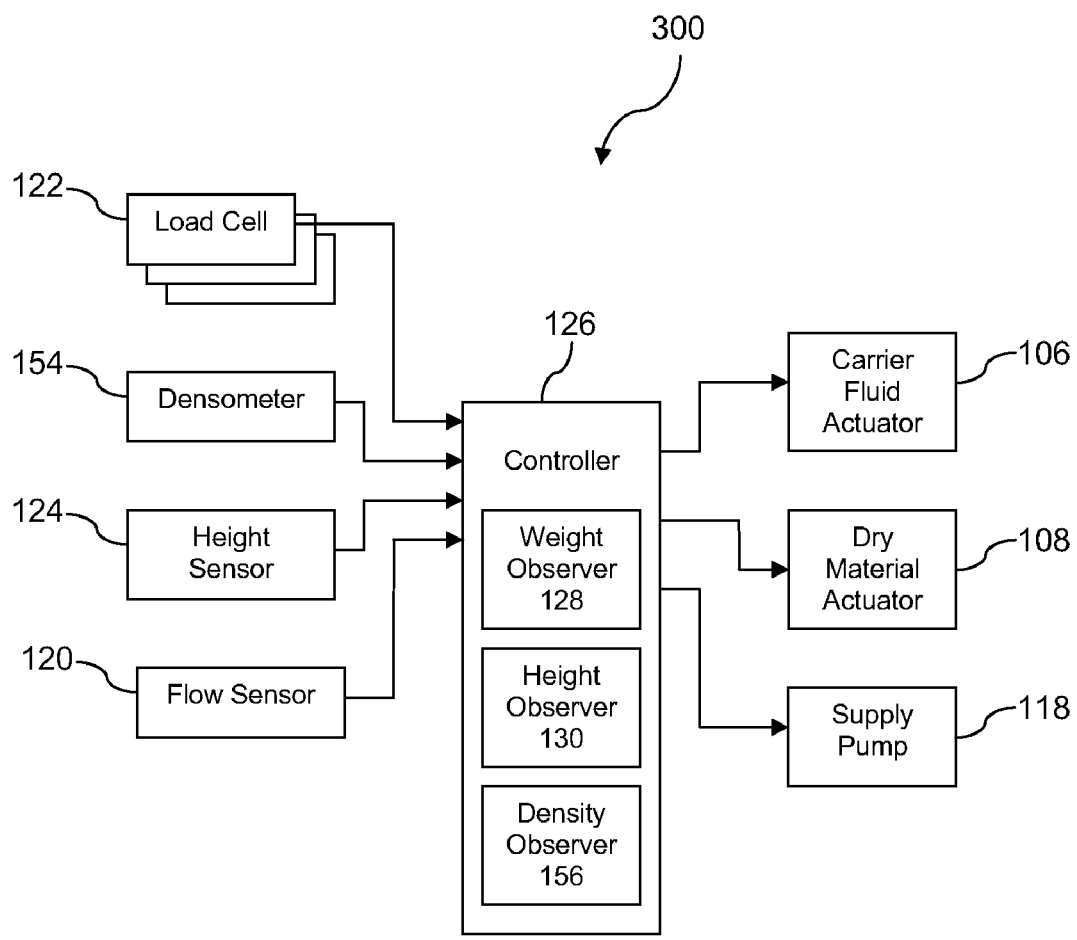
FIG. 5 is a block diagram of a cement mixer control system according to an embodiment of the disclosure.

Turning now to FIG. 5, a control system 300 is described. The control system 300 comprises components already described above with reference to FIGS. 1, 2, 3, and 4. In different embodiments, the control system 300 comprises different combinations of the load cells 122-a, b, the densometer 154, the height sensor 124, and the flow sensor 120. In an embodiment, other load cells, for example the third load cell 152-a, the fourth load cell 152-b, the fifth load cell 204-a, and the sixth load cell 204-b, may be employed in addition to or instead of the load cells 122-a, b. The control system 300 provides commands to control the first actuator 106, the second actuator 108, and the mixture flow rate delivered by the mixture supply pump 118. In some embodiments, the controller 126 may comprise one or more of the weight observer 128, the height observer 130, and the density observer 156 as described above. For further details of some aspects of the controller 126, reference may be made to a similar controller described in U.S. patent application Ser. No. 11/121,278 filed May 3, 2005, entitled "Control System Design for a Mixing System with Multiple Inputs," by Jason D. Dykstra and Justin A. Borgstadt.

Figure 6:
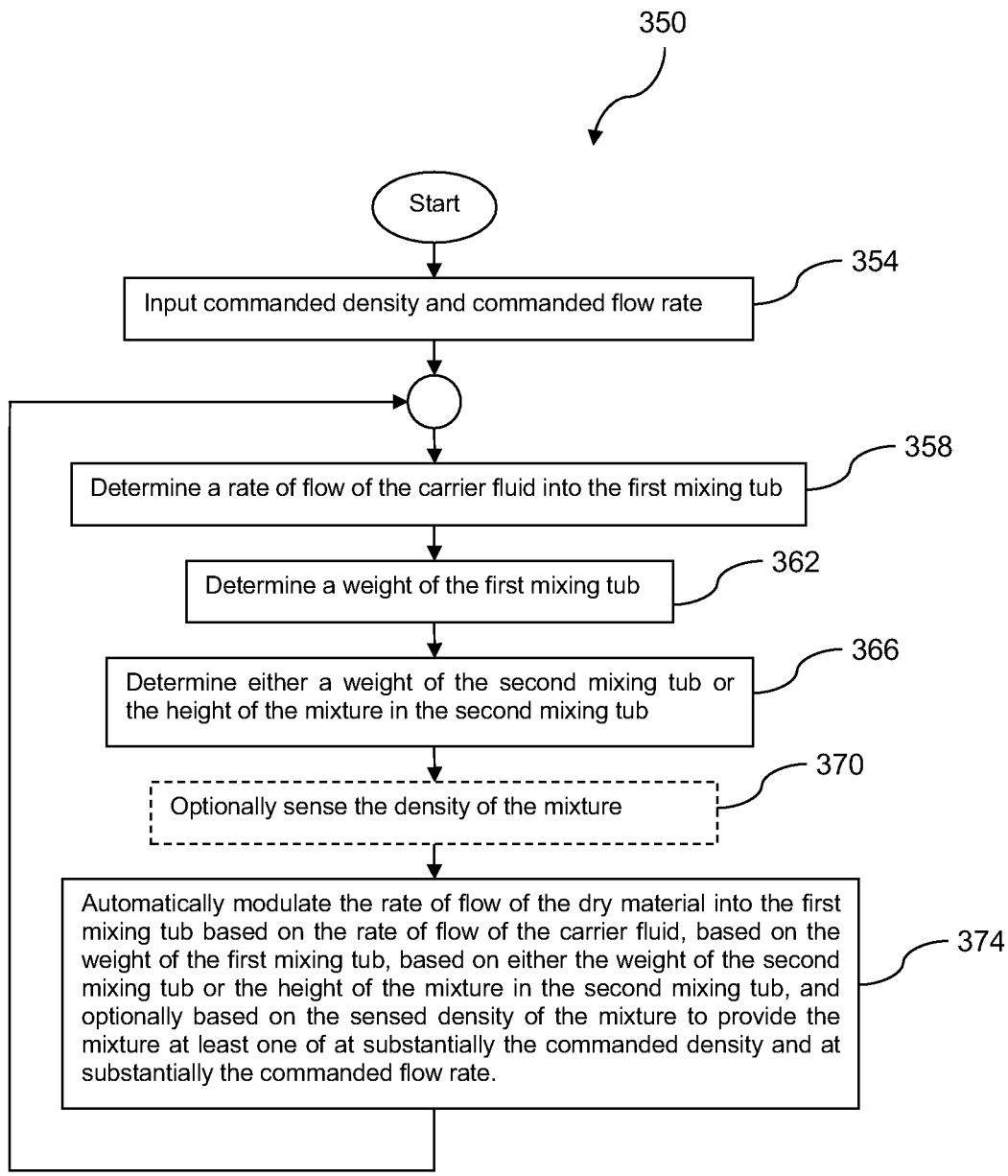
FIG. 6 is a flow chart of a method according to an embodiment of the disclosure.

Turning now to FIG. 6, a method 350 is described. At block 354, inputs are provided identifying a commanded density of the mixture and a commanded flow rate, for example a rate of flow of cement slurry or a fracturing fluid supplied by the mixture supply pump 118. In an embodiment, the inputs may be provided by an operator using a control panel coupled to the controller 126. The control panel may be coupled to the controller 126 by wired or by wireless communication links. One or more hubs, switches, base stations, relays, and/or electronic devices may intervene between the control panel and the controller 126.

At block 358, a rate of flow of the carrier fluid into the first mixing tub 102 is determined. The rate of flow of the carrier fluid may be determined by the controller 126 based on an output of the flow rate sensor 120. The controller 126 may filter and/or condition the output of the flow rate sensor 120 to determine the rate of flow of the carrier fluid, for example adjusting the output of the flow rate sensor 120 according to a linear transformation or a non-linear transformation.

At block 362, a weight of the first mixing tub 102 is determined. The weight may be determined by the controller 126 based on an output of the first weight sensor 122. In an embodiment, the controller 126 may sum outputs of the first load cell 122-a and the second load cell 122-b to determine the weight of the first mixing tub 102. Alternatively, in another embodiment, the controller 126 may sum outputs from three or more load cells 122 to determine the weight of the first mixing tub 102. In an embodiment, the controller 126 may filter and/or condition the output of the first weight sensor 122 and/or the outputs of the load cells 122. In an embodiment, the controller 126 comprises the weight observer 128 that processes the output of the first weight sensor 122 and/or the outputs of the load cells 122 to provide a smoothed, non-lagged estimate of weight of the first mixing tub 102.

At block 366, a weight of the second mixing tub 104 or the height of the mixture in the second mixing tub 104 is determined. In an embodiment, the weight of the second mixing tub 104 may be determined by the controller 126 based on an output of the second weight sensor 152. In an embodiment, the controller 126 may sum outputs of the third load cell 152-a and the fourth load cell 152-b to determine the weight of the second mixing tub 104. Alternatively, in another embodiment, the controller 126 may sum outputs from three or more load cells 152 to determine the weight of the second mixing tub 104. In an embodiment, the controller 126 may filter and/or condition the output of the second weight sensor 152 and/or the outputs of the load cells 152. In an embodiment, the controller 126 comprises an additional weight observer 128 that processes the output of the second weight sensor 152 and/or the outputs of the load cells 152 to provide a smoothed, non-lagged estimate of weight of the second mixing tub 104. In an embodiment, the height of the mixture in the second mixing tub 104 is determined by the controller 126 based on the output of the height sensor 124. In an embodiment, the controller 126 may filter and/or condition the output of the height sensor 124. In an embodiment, the controller 126 comprises the height observer 130 that processes the output of the height sensor 124 to provide a smoothed, non-lagged estimate of the height of the mixture in the second mixing tub 104.

At block 370, the densometer 154 optionally senses the density of the mixture. In some embodiments the densometer 154 may not be required to provide sufficient feedback information to control the density of the mixture and the flow rate of the mixture to the mixture supply pump 118 but may provide desirable corroborative information and/or complementary information to density information determined from other parameters, for example based on the weight of the first mixing tub 102. In an embodiment, the controller 126 may filter and/or condition the output of the densometer 154. In an embodiment, the controller 126 comprises the density observer 156 that processes the output of the densometer 154 to provide a smoothed, non-lagged estimate of density of the mixture.

At block 374, the controller 126 modulates the rate of flow of the dry material into the first mixing tub 102 to provide the mixture at least one of at substantially the commanded density and at substantially the commanded flow rate to the mixture supply pump 118. In an embodiment, the controller 126 modulates the rate of flow of the dry material into the first mixing tub 102 by modulating the second actuator 108, for example by modulating a position, a rotational speed, or a linear speed of the second actuator 108. In some operational modes, the first actuator 106 may be maintained substantially in a fixed position or at substantially a constant speed of rotation or linear speed while the second actuator 108 is adjusted iteratively, for example when the in-flow of the carrier fluid and the dry material substantially equal the commanded flow rate input from the control panel.

The controller 126 modulates the rate of flow of the dry material into the first mixing tub 102 based on the several feedback parameters obtained from the several sensors. In various embodiments, two or more of the weight of the first mixing tub 102, the weight of the second mixing tub 104, the height of the mixture in the second mixing tub 104, and the output of the densometer 154 may be used by the controller 126 to modulate the rate of flow of the dry material into the first mixing tub 102. As described above, the sensed parameter, in some embodiments, may be processed by an observer to produce smoothed, non-lagged estimates of the sensed parameter. The controller 126 may determine a weight of mixture in a mixing tub, for example the weight of the mixture in the first mixing tub 102 and/or the weight of the mixture in the second mixing tub 104, by subtracting the empty weight of the subject mixing tub from the sensed or estimated weight of the mixing tub. When the subject mixing tub is mechanically coupled to other structures, the determination of the weight of the mixture in the subject mixing tub may use a tare weight that comprises the empty weight of the subject mixing tub and a weight corresponding to the mechanically coupled structures. The empty weight of the subject mixing tub or the tare weight of the subject mixing tub may be configured into the controller 126. Alternatively, the determination of the weight of the mixture in the subject mixing tub may use the sensed weight of the subject mixing tub in combination with a break point look-up table. The controller 126 may further control the mixture supply pump 118 to control the outflow of mixture. The process 350 proceeds from block 374 back to block 358, suggesting the repetitive and/or iterative nature of the controlling operation.

In an embodiment, the controller 126 modulates both the first actuator 106 to control the in-flow of the carrier fluid and the second actuator 108 to control the in-flow of the dry material into the first mixing tub 102 to provide the mixture at substantially the commanded density and at substantially the commanded flow rate to the mixture supply pump 118.

Figure 7:
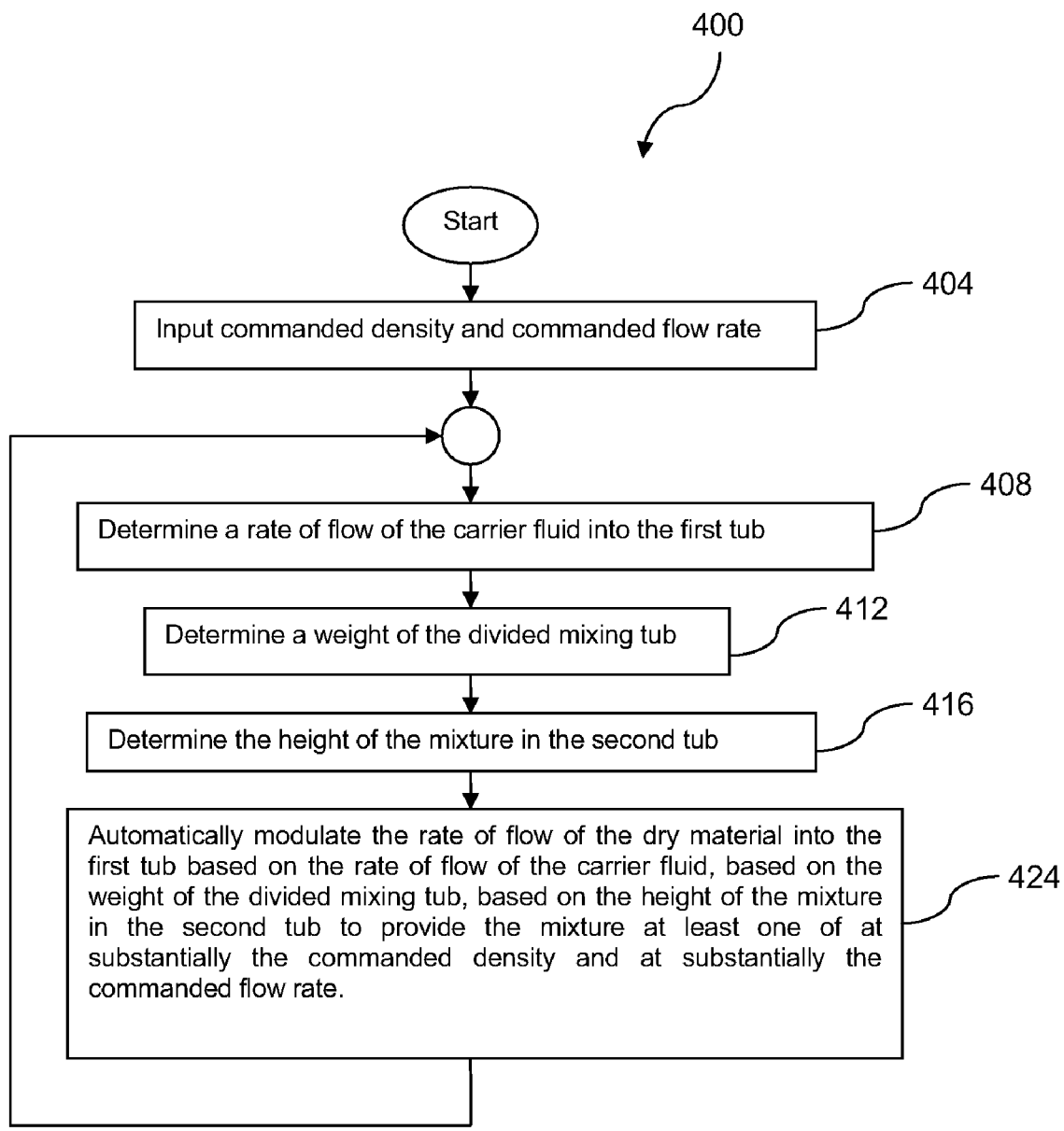
FIG. 7 is a flow chart of another method according to an embodiment of the disclosure.

Turning now to FIG. 7, a method 400 is described. At block 404, inputs are provided identifying a commanded density of the mixture and a commanded flow rate, for example a rate of flow of cement slurry or fracturing fluid supplied by the mixture supply pump 118. In an embodiment, the inputs may be provided by an operator using a control panel coupled to the controller 126.

At block 408, a rate of flow of the carrier fluid into the first tub is determined. The rate of flow of the carrier fluid may be determined by the controller 126 based on an output of the flow rate sensor 120. The controller 126 may filter and/or condition the output of the flow rate sensor 120 to determine the rate of flow of the carrier fluid, for example adjusting the output of the flow rate sensor 120 according to a linear transformation or a non-linear transformation.

At block 412, a weight of the divided mixing tub 202 is determined. The weight may be determined by the controller 126 based on an output of the third weight sensor 204. In an embodiment, the controller 126 may sum outputs of the fifth load cell 204-a and the sixth load cell 204-b to determine the weight of the divided mixing tub 202. Alternatively, in another embodiment, the controller 126 may sum outputs from three or more load cells 204 to determine the weight of the divided mixing tub 202. In an embodiment, the controller 126 may filter and/or condition the output of the third weight sensor 204 and/or the outputs of the load cells 204. In an embodiment, the controller 126 comprises the weight observer 128 that processes the output of the third weight sensor 204 and/or the outputs of the load cells 204 to provide a smoothed, non-lagged estimate of weight of the divided mixing tub 202.

At block 416, the height of the mixture in the second tub is determined. In an embodiment, the height of the mixture in the second tub is determined by the controller 126 based on the output of the height sensor 124. In an embodiment, the controller 126 may filter and/or condition the output of the height sensor 124. In an embodiment, the controller 126 comprises the height observer 130 that processes the output of the height sensor 124 to provide a smoothed, non-lagged estimate of the height of the mixture in the second tub.

At block 424, the controller 126 modulates the rate of flow of the dry material into the first tub to provide the mixture at least one of at substantially the commanded density and at substantially the commanded flow rate to the mixture supply pump 118. In an embodiment, the controller 126 modulates the rate of flow of the dry material into the first tub by modulating the second actuator 108. In some operational modes, the first actuator 106 may be maintained substantially in a fixed position or at a fixed speed of rotation or linear speed while the second actuator 108 is adjusted iteratively, for example when the in-flow of the carrier fluid and the dry material substantially equal the commanded flow rate input from the control panel.

The controller 126 modulates the rate of flow of the dry material into the first tub based on the weight of the divided mixing tub 202 and the height of the mixture in the second tub. As described above, the sensed parameters of weight and height, in some embodiments, may be processed by observers to produce smoothed, non-lagged estimates of the sensed parameters. The controller 126 may determine a weight of mixture in a mixing tub, for example the weight of the mixture in the divided mixing tub 202 by subtracting the empty weight of the divided mixing tub 202 from the sensed or estimated weight of the divided mixing tub 202. Alternatively, because the divided mixing tub 202 is mechanically coupled to other structures, the determination of the weight of the mixture in the divided mixing tub 202 may use a tare weight that comprises the empty weight of the divided mixing tub 202 and a weight corresponding to the mechanically coupled structures. The empty weight of the divided mixing tub 202 or the tare weight of the subject mixing tub may be configured into the controller 126. Alternatively, the determination of the weight of the mixture in the divided mixing tub 202 may use the sensed weight of the divided mixing tub 202 in combination with a break point look-up table. The controller 126 may further control the mixture supply pump 118 to control the outflow of the mixture. The process 400 proceeds from block 424 back to block 408, suggesting the repetitive and/or iterative nature of the controlling operation.

In an embodiment, the controller 126 modulates both the first actuator 106 to control the in-flow of the carrier fluid and the second actuator 108 to control the in-flow of the dry material into the first tub to provide the mixture at substantially the commanded density and at substantially the commanded flow rate to the mixture supply pump 118.

Cement compositions may be used as well bore servicing fluids. As used herein, a "servicing fluid" refers to a fluid used to drill, complete, work over, fracture, repair, or in any way prepare a well bore for the recovery of materials residing in a subterranean formation penetrated by the well bore. It is to be understood that "subterranean formation" encompasses both areas below exposed earth and areas below earth covered by water such as ocean or fresh water. Examples of servicing fluids include, but are not limited to, cement slurries, drilling fluids or muds, spacer fluids, fracturing fluids or completion fluids, all of which are well known in the art. Without limitation, servicing the well bore includes positioning the cement composition in the well bore to isolate the subterranean formation from a portion of the well bore; to support a conduit in the well bore; to plug a void or crack in the conduit; to plug a void or crack in a cement sheath disposed in an annulus of the well bore; to plug an opening between the cement sheath and the conduit; to prevent the loss of aqueous or non-aqueous drilling fluids into loss circulation zones such as a void, vugular zone, or fracture; to be used as a fluid in front of mixture in cementing operations; to seal an annulus between the well bore and an expandable pipe or pipe string; or combinations thereof.

The cement compositions may be introduced to the well bore to prevent the loss of aqueous or non-aqueous drilling fluids into loss-circulation zones such as voids, vugular zones, and natural or induced fractures while drilling. In an embodiment, the cement composition is placed into a well bore as a single stream and activated by downhole conditions to form a barrier that substantially seals loss circulation zones. In such an embodiment, the cement composition may be placed downhole through the drill bit forming a composition that substantially eliminates the lost circulation. In yet another embodiment, the cement composition is formed downhole by the mixing of a first stream comprising one or more cement composition components and a second stream comprising additional cement composition components. For example, the cement compositions may be formed downhole by the mixing of a first stream comprising a cement and a second stream comprising additional components. Methods for introducing compositions into a well bore to seal subterranean zones are described in U.S. Pat. Nos. 5,913,364; 6,167,967; and 6,258,757, each of which is incorporated by reference herein in its entirety.

The cement compositions may form a non-flowing, intact mass inside the loss-circulation zone which plugs the zone and inhibits loss of subsequently pumped drilling fluid, which allows for further drilling.

In an embodiment, the cement compositions may be employed in well completion operations such as primary and secondary cementing operations. The cement composition may be placed into an annulus of the well bore and allowed to set such that it isolates the subterranean formation from a different portion of the well bore. The cement composition thus forms a barrier that prevents fluids in that subterranean formation from migrating into other subterranean formations. Within the annulus, the cement composition also serves to support a conduit, e.g., casing, in the well bore. In an embodiment, the well bore in which the composition is positioned belongs to a multilateral well bore configuration. It is to be understood that a multilateral well bore configuration includes at least two principal well bores connected by one or more ancillary well bores.

In secondary cementing, often referred to as squeeze cementing, the cement compositions may be strategically positioned in the well bore to plug a void or crack in the conduit, to plug a void or crack in the hardened sealant (e.g., cement sheath) residing in the annulus, to plug a relatively small opening known as a microannulus between the hardened sealant and the conduit, and so forth. Various procedures that may be followed to use a sealant composition in a well bore are described in U.S. Pat. Nos. 5,346,012 and 5,588,488, which are incorporated by reference herein in their entirety.

In other embodiments, additives are also pumped into the well bore with the cement compositions. For instance, fluid absorbing materials, particulate materials, resins, aqueous superabsorbers, viscosifying agents, suspending agents, dispersing agents, or combinations thereof can be pumped in the stream with the cement compositions disclosed.

Figure 8:
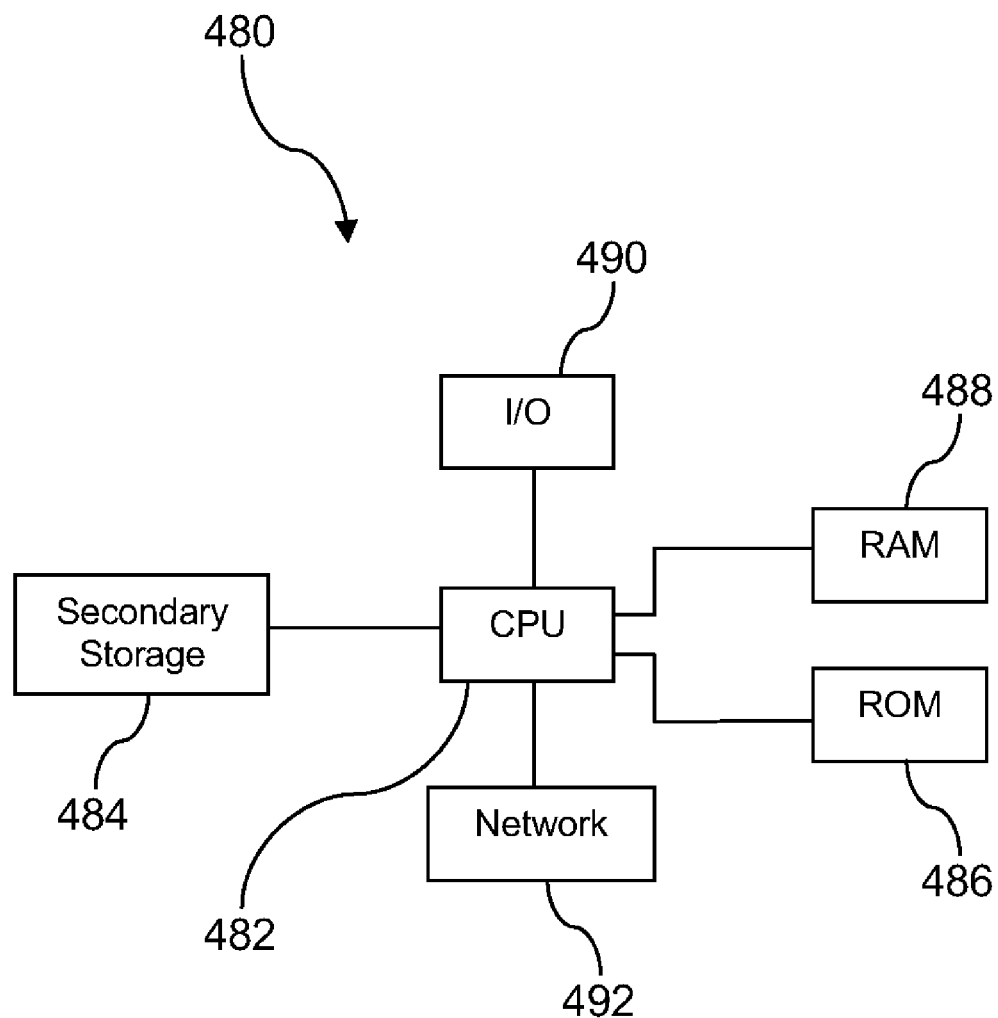
FIG. 8 is a block diagram of an exemplary general purpose computer system suitable for implementing some aspects of the several embodiments of the disclosure.

Some aspects of the systems described above may be implemented on any general-purpose computer with sufficient processing power, memory resources, and network throughput capability to handle the necessary workload placed upon it. FIG. 8 illustrates a typical, general-purpose computer system suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor may be implemented as one or more CPU chips.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage. The RAM 488 is used to store volatile data and perhaps to store instructions. Access to both ROM 486 and RAM 488 is typically faster than to secondary storage 484.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. While only one processor 492 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mixing system, comprising:
   a first mixing tub;
   a first actuator to control flow of a carrier fluid into the first mixing tub;
   a sensor to determine a rate of flow of the carrier fluid;
   a second actuator to control flow of a dry material into the first mixing tub, wherein the carrier fluid and the dry material mix in the first mixing tub to form a mixture;
   an at least one weight sensor to determine a weight of the first mixing tub;
   a second mixing tub, wherein the first mixing tub is configured to flow the mixture into the second mixing tub; and
   a controller to automatically modulate the second actuator based on the rate of flow of the carrier fluid, based on the weight of the first mixing tub, and based on one of a sensed height of the mixture in the second mixing tub and a sensed weight of the second mixing tub to provide the mixture at substantially a commanded density and/or at substantially a commanded flow rate to a well bore, wherein the controller determines a weight of the mixture in the first tub based on using the weight of the first mixing tub to index into a look-up table and wherein the controller automatically modulates the second actuator based at least in part on the weight of the mixture in the first tub, wherein the look-up table takes account of mechanical coupling of the first mixing tub to other structures.

2. The mixing system of claim 1, wherein the controller further automatically modulates the first actuator based on the rate of flow of the carrier fluid, based on the weight of the first mixing tub, and based on one of the sensed height of the mixture in the second mixing tub and the sensed weight of the second mixing tub and wherein the controller automatically modulates the first actuator and the second actuator to provide the mixture at substantially the commanded density and substantially the commanded flow rate to the well bore.

3. The mixing system of claim 1, further comprising a weight observer to provide an estimate of the weight of the first mixing tub and a first estimate of the disturbance based on an output of the at least one weight sensor, wherein the estimate of the weight of the first mixing tub is a smoothed, unlagged value, and wherein the controller automatically modulates the second valve in part based on the estimate of the weight of the first mixing tub and in part based on the first estimate of the disturbance.

4. The mixing system of claim 1, wherein the first mixing tub is mechanically decoupled from the second mixing tub.

5. The mixing system of claim 1, wherein the controller automatically modulates the second valve in part based on an estimated density of the mixture, wherein the controller determines the estimated density by dividing an estimate of the weight of the mixture in the first mixing tub by a volume of the first mixing tub and wherein the estimate of the weight of the mixture in the first mixing tub is based on the weight of the first mixing tub.

6. The mixing system of claim 1, wherein the mixture is a cement slurry or a fracturing fluid.

7. The mixing system of claim 1, further comprising a height observer to provide an estimate of the height of the mixture in the second mixing tub and an estimate of the disturbance based on an output of a height sensor, wherein the estimate of the height of the mixture in the second mixing tub is a smoothed, unlagged value, and wherein the controller automatically modulates the second valve in part based on the estimate of the height of the mixture in the second mixing tub and in part based on the second estimate of the disturbance.

8. A mixing system, comprising:
   a first mixing tub;
   a first actuator to control flow of a carrier fluid into the first mixing tub;
   a sensor to determine a rate of flow of the carrier fluid;
   a second actuator to control flow of a dry material into the first mixing tub, wherein the carrier fluid and the dry material mix in the first mixing tub to form a mixture;
   a density sensor to determine a density of the mixture in the first mixing tub;
   a second mixing tub, wherein the first mixing tub is configured to flow the mixture into the second mixing tub;
   an at least one weight sensor to determine a weight of the second mixing tub;
   a controller to automatically modulate the second actuator based on the rate of flow of the carrier fluid, based on the density of the mixture in the first mixing tub, and based on the weight of the second mixing tub to provide the mixture at substantially a commanded density and/or at substantially a commanded flow rate to a well bore, and further comprising an at least one weight sensor to determine a sensed weight of the first mixing tub, wherein the controller automatically modulates the second actuator based in part on corroborating the density of the mixture in the first mixing tub determined by the density sensor using the sensed weight of the first mixing tub.

9. The mixing system of claim 8, further comprising a recirculation mechanism to recirculate the mixture in the first mixing tub and wherein the density sensor is collocated with the recirculation mechanism.

10. The mixing system of claim 8, further comprising a weight observer to provide an estimate of the weight of the second mixing tub and an estimate of the disturbance based on an output of the at least one weight sensor, wherein the estimate of the weight of the second mixing tub is a smoothed, unlagged value, and wherein the controller automatically modulates the second valve in part based on the estimate of the weight of the second mixing tub and in part based on the estimate of the disturbance.

11. The mixing system of claim 8, wherein the controller is one of an analog control system comprised of control blocks implemented by differential amplifiers, resistors, and capacitors and a digital control system comprised of control blocks implemented by computer instructions.

12. The mixing system of claim 8, wherein the controller further automatically modulates the first actuator based on the rate of flow of the carrier fluid, based on the density of the mixture in the first mixing tub, and based on the weight of the second mixing tub and wherein the controller automatically modulates the first actuator and the second actuator to provide the mixture at substantially the commanded density and at substantially the commanded flow rate to the well bore.

13. A mixing system, comprising:
a divided mixing tub comprising a first tub and a second tub;
a first actuator to control flow of a carrier fluid into the first tub;
a sensor to determine a rate of flow of the carrier fluid;
a second actuator to control flow of a dry material into the first tub, wherein the carrier fluid and the dry material mix in the first tub to form a mixture, the mixture overflows the first tub into the second tub, and the mixture is further mixed in the second tub;
an at least one weight sensor to determine the weight of the divided mixing tub;
a height sensor to determine a height of the mixture in the second tub; and
a controller to automatically modulate the second actuator based on the rate of flow of the carrier fluid, based on the height of the mixture in the second tub, and based on the weight of the divided mixing tub to provide the mixture at substantially a commanded density and/or at substantially a commanded flow rate to a well bore, wherein the controller determines a weight of the mixture in the divided mixin tub based on usin the wei ht of the divided mixin tub to index into a look-up table and wherein the controller automatically modulates the second actuator based at least in part on the weight of the mixture in the divided mixing tub, wherein the look-up table takes account of mechanical coupling of the divided mixing tub to other structures.

14. The mixing system of claim 13, wherein the controller further automatically modulates the first actuator based on the rate of flow of the carrier fluid, based on the weight of the divided mixing tub, and based on the height of the mixture in the second tub and wherein the controller automatically modulates the first actuator and the second actuator to provide the mixture at substantially the commanded density and substantially the commanded flow rate to the well bore.

15. The mixing system of claim 13, further comprising a weight observer to provide an estimate of the weight of the divided mixing tub and a first estimate of the disturbance based on an output of the at least one weight sensor, wherein the estimate of the weight of the divided mixing tub is a smoothed, unlagged value, and wherein the controller automatically modulates the second valve in part based on the estimate of the weight of the divided mixing tub and in part based on the first estimate of the disturbance.

16. The mixing system of claim 13, wherein the controller automatically modulates the second actuator in part based on an estimated density of the mixture, wherein the controller determines the estimated density by dividing an estimate of the weight of the mixture in the dividing mixing tub by a volume of the mixture in the divided mixing tub and wherein the volume of the mixture in the divided mixing tub is based in part on the height of the mixture in the second tub.

17. The mixing system of claim 13, further comprising a height observer to provide an estimate of the height of the mixture in the second tub and a second estimate of the disturbance based on an output of a height sensor, wherein the estimate of the height of the second tub is a smoothed, unlagged value, and wherein the controller automatically modulates the second valve in part based on the estimate of the height of the mixture in the second tub and in part based on the second estimate of the disturbance.

18. The mixing system of claim 1, further comprising an at least one weight sensor to determine a sensed weight of the second mixing tub, wherein the controller automatically modulates the second actuator based on the sensed weight of the second mixing tub.

\* \* \* \* \*